(12) United States Patent
Guérin et al.

(10) Patent No.: US 10,859,160 B2
(45) Date of Patent: Dec. 8, 2020

(54) CALIBRATION METHOD FOR A SLIP CONTROL ARRANGEMENT OF A DRIVELINE INCLUDING A CONTINUOUSLY VARIABLE TRANSMISSION

(71) Applicant: Transmission CVTCORP Inc., Ste-Julie (CA)

(72) Inventors: Jonathan Guérin, Sainte-Julie (CA); Jean-François Dionne, LaPrairie (CA)

(73) Assignee: TRANSMISSION CVTCORP INC., Quebec (CA)

( * ) Notice: Subject to any disclaimer, the term of this patent is extended or adjusted under 35 U.S.C. 154(b) by 1 day.

(21) Appl. No.: 16/380,517

(22) Filed: Apr. 10, 2019

(65) Prior Publication Data
US 2019/0316675 A1    Oct. 17, 2019

Related U.S. Application Data

(60) Provisional application No. 62/656,065, filed on Apr. 11, 2018.

(51) Int. Cl.
*B60W 10/02* (2006.01)
*F16H 61/14* (2006.01)

(52) U.S. Cl.
CPC ......... *F16H 61/143* (2013.01); *B60W 10/026* (2013.01); *B60W 2510/0657* (2013.01); *F16H 2061/145* (2013.01)

(58) Field of Classification Search
CPC ............. F16H 61/143; F16H 2061/145; F16H 2059/147; F16H 61/66; F16H 2342/042; F16H 2342/10; B60W 10/026; B60W 2510/0657; F16D 2500/70458; F16D 2500/70468; F16D 2500/70426; F16D 2500/50254; F16D 2500/50263; F16D 2500/50281; F16D 2500/50866; F16D 2500/50287; F16D 2500/3065; F16D 2500/30406; F16D 2500/1045; F16D 48/06
See application file for complete search history.

(56) References Cited

U.S. PATENT DOCUMENTS

| | | | |
|---|---|---|---|
| 6,397,995 B1* | 6/2002 | Ellsworth | B60H 1/3208 192/103 C |
| 10,711,846 B2* | 7/2020 | Severinsson | F16H 25/20 |
| 2018/0162378 A1* | 6/2018 | Kim | B60W 10/08 |

* cited by examiner

*Primary Examiner* — David J Hlavka
(74) *Attorney, Agent, or Firm* — K&L Gates LLP

(57) ABSTRACT

A calibration method for a slip control arrangement of a driveline including a continuously variable transmission is described herein. The driveline includes a clutch that is so controlled as to slip when a torque higher than the usable torque attempts to pass through. Accordingly, the clutch prevents the prime mover from stalling. A calibration method to link a valve command value and a torque allowed to pass through the clutch includes preventing the vehicle from moving and increasing the pressure applied in the clutch while noting the torque % value developed by the prime mover.

16 Claims, 5 Drawing Sheets

CALIBRATION METHOD FOR A SLIP CONTROL ARRANGEMENT OF A DRIVELINE INCLUDING A CONTINUOUSLY VARIABLE TRANSMISSION

CROSS REFERENCE TO RELATED APPLICATIONS

This application claims priority to and benefit of U.S. Provisional Application No. 62/656,065 filed on Apr. 11, 2018, the entire disclosure of which is incorporated by reference herein.

FIELD

The present disclosure generally relates to drivelines including a continuously variable transmission (CVT). More specifically, the present disclosure is concerned with a calibration method for a slip control arrangement for such a driveline.

BACKGROUND

CVTs are very interesting in all kinds of vehicles for their ability to continuously vary the speed ratio between the output of a prime mover and the wheels or other rotating parts of a vehicle.

However, some vehicular applications conventionally require a so-called torque converter between the prime mover and the wheels to a) prevent the prime mover from stalling when the wheels are prevented from rotating while powered and b) increase the torque when the torque converter is slipping. These applications are generally not ideal candidates for continually variable transmissions since the advantages of the CVT are generally mitigated from the use of a torque converter.

A method and arrangement for preventing the prime mover of a driveline provided with a CVT from stalling and multiplying the torque when the wheels are partially or totally prevented from rotating have been designed. A calibration method for such an arrangement is required.

DETAILED DESCRIPTION

Figure 1:
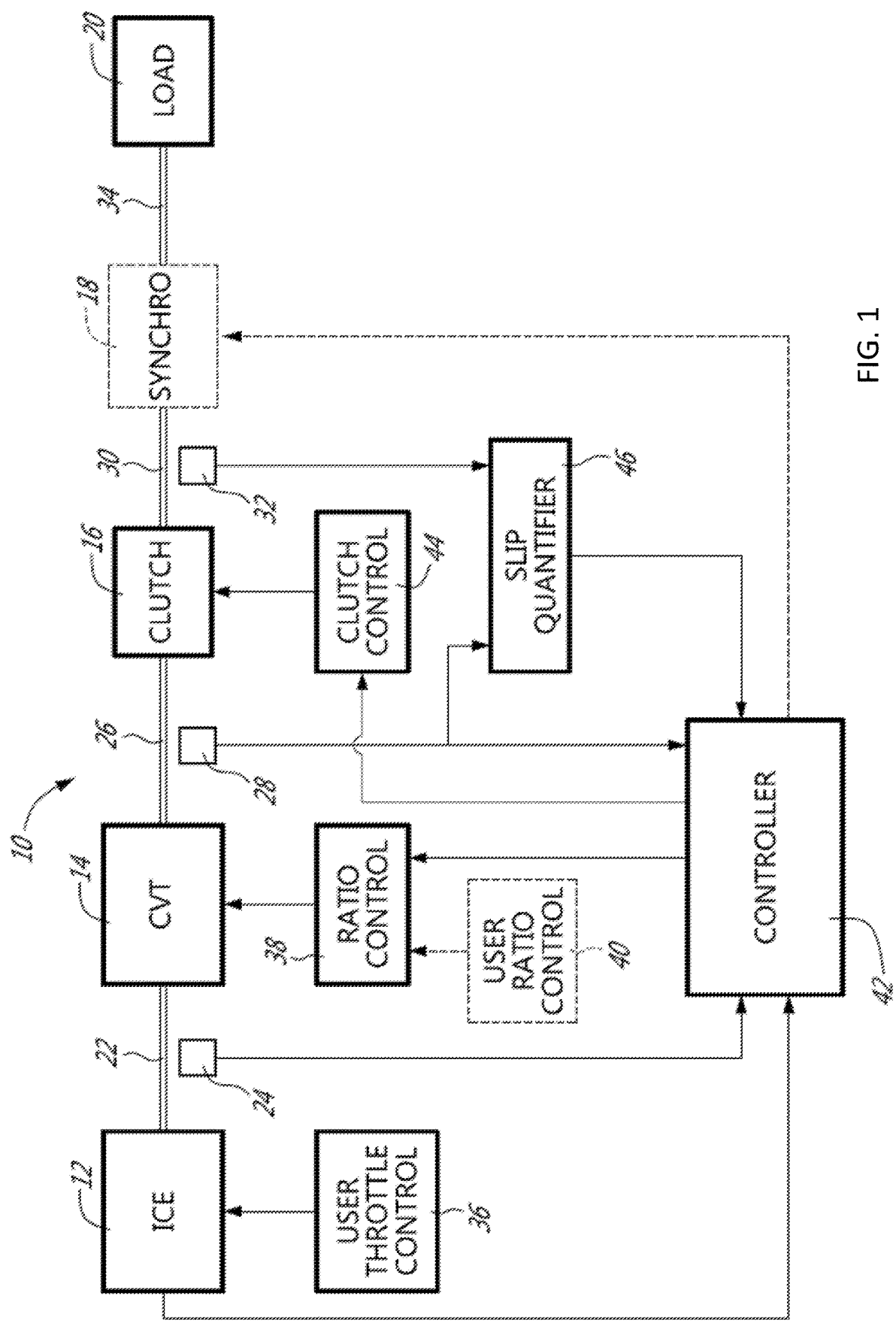
FIG. 1 is a block diagram of a driveline including a CVT and a slip control arrangement.

An object is generally to provide a calibration method for a slip control arrangement provided in a driveline including a CVT.

According to an illustrative embodiment, there is provided a calibration method for a slip control arrangement of a vehicle driveline including a continuously variable transmission where slipping is allowed via a clutch provided with a clutch controller that determines, via a valve mechanism, the amount of torque allowed to pass through the clutch before the clutch starts slipping; the driveline including a prime mover and a controller so connected to the prime mover as to receive torque data therefrom; the calibration method of the valve mechanism comprising:

placing the prime mover in predetermined rotational speed conditions while preventing the vehicle from moving;
closing the valve mechanism;
recording an idle engine torque value from the torque data from the prime mover;
gradually opening the valve mechanism until a first predetermined engine torque data value is reached and recording a first valve setting value and a corresponding engine torque value;
gradually opening the valve mechanism until a second predetermined engine torque data value is reached and recording a second valve setting value and a corresponding engine torque value;
calculating a clutch kiss point valve setting;
gradually opening the valve mechanism until a third predetermined engine torque data value is reached and recording a third valve setting value and a corresponding engine torque value;
calculating a 100% torque point; and
calculating clutch torques corresponding to engine torque values.

According to another aspect, there is provided a driveline comprising a prime mover, a continuously variable transmission, a controller so connected to the prime mover as to receive torque data therefrom, a slip control arrangement including a clutch so controlled by a clutch controller including a valve mechanism to allow a controllable amount of torque to pass through the clutch and to slip if a higher amount of torque tries to pass, a calibration method of the valve mechanism comprising:

placing the prime mover in predetermined rotational speed conditions while preventing the vehicle from moving;
closing the valve mechanism;
recording an idle engine torque value from the torque data from the prime mover;
gradually opening the valve mechanism until a first predetermined engine torque data value is reached and recording a first valve setting and a corresponding engine torque value;
gradually opening the valve mechanism until a second predetermined engine torque data value is reached and recording a second valve setting and a corresponding engine torque value;
calculating a clutch kiss point;
gradually opening the valve mechanism until a third predetermined engine torque data value is reached and recording a third valve setting and a corresponding engine torque value;
calculating a 100% torque point; and
calculating clutch torques corresponding to engine torques.

According to yet another aspect, there is provided a ***A calibration method to determine the filling time of a clutch controlled by a proportional valve, the clutch being part of a driveline including a prime mover, a controller so connected to the prime mover as to receive torque data therefrom; the method comprising:

subjecting the clutch to a sequence of short pulses of valve opening at a predetermined valve command value, the successive short pulses increasing in duration while the torque data received is monitored;

stopping the short pulses when a change is detected in the torque data received; and setting the filling time of the clutch as the last pulse duration of valve opening supplied to the clutch.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The expression "connected" should be construed herein and in the appended claims broadly so as to include any cooperative or passive association between mechanical parts or components. For example, such parts may be assembled together by direct connection, or indirectly connected using further parts therebetween. The connection can also be remote, using for example a magnetic field or else.

The term "about" is used to indicate that a value includes an inherent variation of error for the device or the method being employed to determine the value.

It is to be noted that the expression "prime mover" is to be construed herein and in the appended claims as an internal combustion engine (ICE), a turbine engine, or any other mechanical power production element or assembly.

It is to be noted that the term "CVT", standing for Continuously Variable Transmission, is used herein to describe any type of CVT including, amongst others, a toroidal CVT, a dual-cavity full toroidal CVT, a half-toroidal CVT, a single cavity toroidal CVT, a hydrostatic CVT, a variable diameter pulley CVT, a magnetic CVT, a ratcheting CVT and a cone CVT.

It is to be noted that the expression "overdrive" when used in the context of a CVT, is to be construed herein and in the appended claims as a condition where the CVT ratio is such that the CVT output speed is higher than the CVT input speed. The CVT ratio (of output speed to input speed) is therefore higher that one to one (1:1).

It is to be noted that the expression "underdrive" when used in the context of a CVT, is to be construed herein and in the appended claims as a condition where the CVT ratio is such that the CVT output speed is lower than the CVT input speed. The CVT ratio (of output speed to input speed) is therefore lower that one to one (1:1).

It will also be noted that the expressions "fixed disk", when used herein and in the appended claims in the context of clutch technology, may be viewed as any element or group of elements constituting a clutch driving member. Similarly, the expressions "movable disk", when used herein and in the appended claims in the context of clutch technology, may be viewed as any element or group of elements constituting a clutch driven member.

It is to be noted that the expression "off-highway vehicle" is to be construed herein and in the appended claims as any type of vehicle that is designed specifically for use off-road, including, amongst others, construction vehicles and agricultural vehicles.

Other objects, advantages and features of the calibration method for a slip control arrangement of a driveline including a CVT will become more apparent upon reading of the following non-restrictive description of illustrative embodiments thereof, given by way of example only with reference to the accompanying drawings.

Before describing the features of a calibration method according to an illustrative embodiment, a driveline including a CVT and a slip control arrangement will be described. More specifically, FIG. 1 of the appended drawings illustrates a driveline 10 comprising a prime mover in the form of an ICE 12, a CVT 14, a clutch 16 and an optional synchro 18. The output of the optional synchro 18 is connected to a load 20, for example wheels of an off-highway vehicle. Of course, should the optional synchro 18 be absent from the design, the output of the clutch 16 would be connected to the load 20.

A first shaft 22 interconnects the output of the ICE 12 and the input of the CVT 14; the speed of the first shaft is measured via a first speed sensor 24. A second shaft 26 interconnects the output of the CVT 14 and the input of the clutch 16; the speed of the second shaft 26 is measured via a second speed sensor 28. A third shaft 30 interconnects the output of the clutch 16 and the input of the optional synchro 18; the speed of the third shaft 30 is measured via a third speed sensor 32. Finally, a fourth shaft 34 interconnects the output of the optional synchro 18 and the load 20.

Of course, as mentioned hereinabove, one skilled in the art will understand that should the synchro 18 be absent, the shaft 34 would not be present and the shaft 30 would interconnect the output of the clutch 16 and the load 20.

Conventionally, the ICE 12 is associated with a user throttle control 36, for example an acceleration pedal (not shown). The ICE 12 is connected to a main controller 42, for example via a CAN bus, so that the controller received operational data from the ICE 12. One skilled in the art will understand that should the operational data received from the ICE 12 include the instantaneous speed of the output thereof, the first speed sensor 24 would not be absolutely required but could still be interesting should the data be transferred faster to the main controller 42.

The driveline 10 includes a ratio controller 38 so configured as to set the ratio of the CVT 14 according to either a ratio provided by the user via a user ratio control 40 or according to a ratio provided by the main controller 42 as will be described hereinbelow. It will be understood from the foregoing description that the ratio supplied by the main controller 42 has precedence over the user ratio control 40. Accordingly, the main controller 42 may take over and dictate the ratio of the CVT 14. As will be apparent to one skilled in the art the user ratio control 40 is optional.

A clutch controller 44 is so configured as to take a usable torque value from the main controller 42 and to control the clutch 16 so as to slip when the torque attempting to pass through is greater than this usable torque. In other words, when the torque between the input and output of the clutch 16 is greater than the usable torque, the clutch 16 slips.

It is believed that one skilled in the art will have no problem building such a clutch controller adapted to the technology used in the clutch 16.

As an illustrative example, in a particular clutch technology, the pressure between the fixed and movable disks of the clutch 16, and therefore the torque allowed to pass therebetween, is controlled by a hydraulic pressure and the clutch controller 44 includes a proportional pressure reducing/relieving valve (not shown) that may be controlled by the controller 42. In the illustrated non-limitative embodiment described herein, it is the calibration of this proportional pressure reducing/relieving valve that is performed as will be described hereinbelow, following the description of the driveline 10.

As a non-limiting example, valve PRDLXSN912N from the company Sun Hydraulics have been found adequate as a proportional pressure reducing/relieving valve.

Returning to FIG. 1 of the appended drawings, the speed data from the first and second speed sensors 24 and 28 is supplied to the main controller 42 so that the controller 42 may determine the actual ratio of the CVT in real time. Furthermore, the speed data of the second and third speed sensors 28 and 32 is supplied to a slip quantifier 46 that may determine the slippage level of the clutch 16, in real time, and supply this data to the main controller 42.

As shown in the appended drawings, the synchro 18 and its connection to the main controller 42 are optional and shown schematically. This synchro 18 is there to represent, for example, a conventional multi speed arrangement that allows different gear ratios to be interposed between the clutch 16 and the load. A direction reversal arrangement may also be part of the synchro 18. Since the configurations and the operation of such a synchro are believed known to those skilled in the art, they will not be further described herein.

Figure 2:
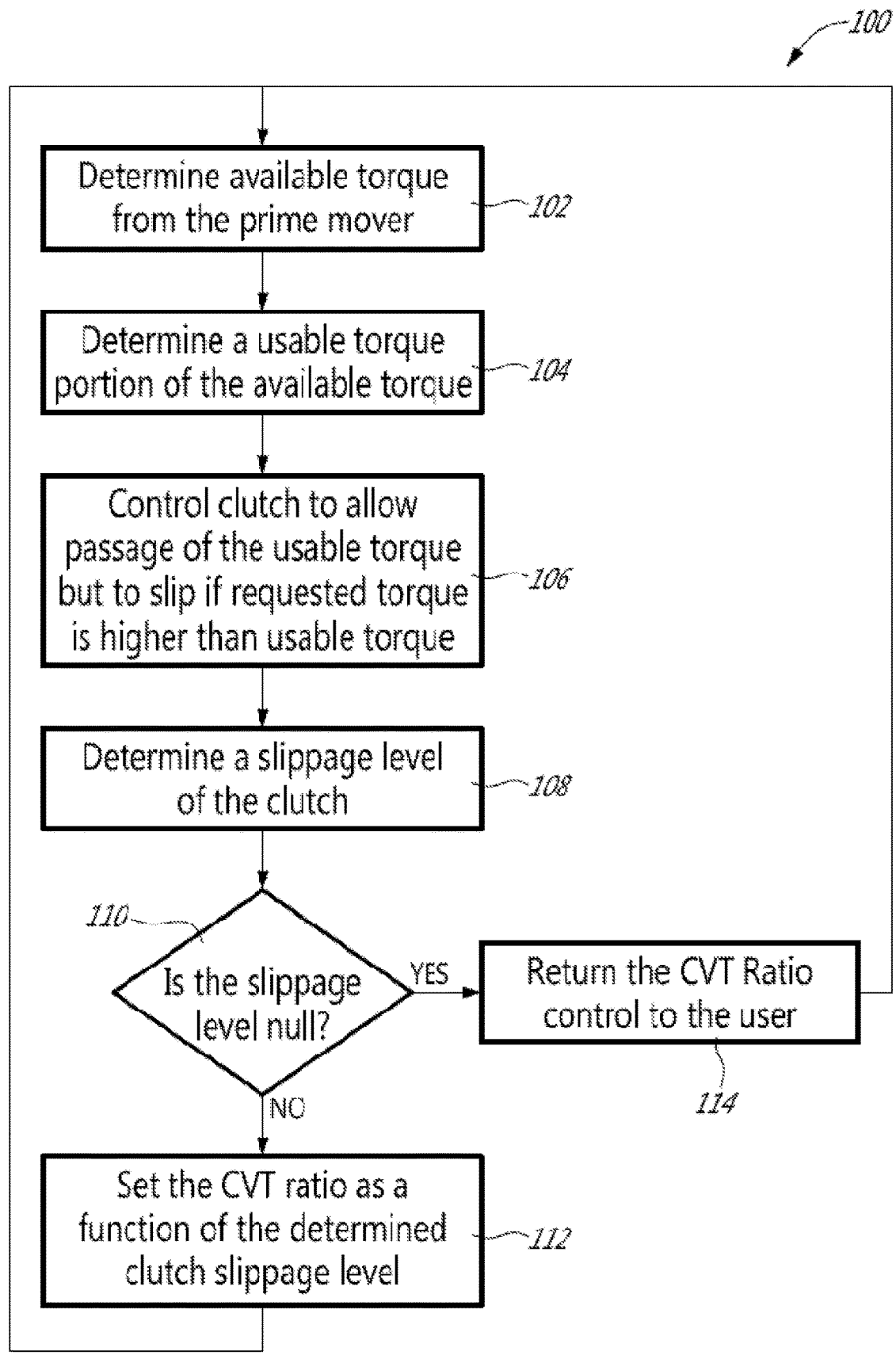
FIG. 2 is a block diagram of a method to control the slip of a clutch.

Turning now to FIG. 2 of the appended drawings, a slip control method 100 for a driveline including a CVT will be described.

The first step 102 of the method 100 consists of determining the available torque from the prime mover. With reference to FIG. 1, the prime mover, in the form of the ICE 12, has a map of available torque depending on the RPM of its output shaft. This table is either built in the ICE and can be supplied to the controller 42, known and stored in the controller 42 or has been built by the driveline manufacturer and stored in the controller 42. Since the controller 42 has the speed data from the first speed sensor 24, it can look up the available torque in real time.

Figure 3:
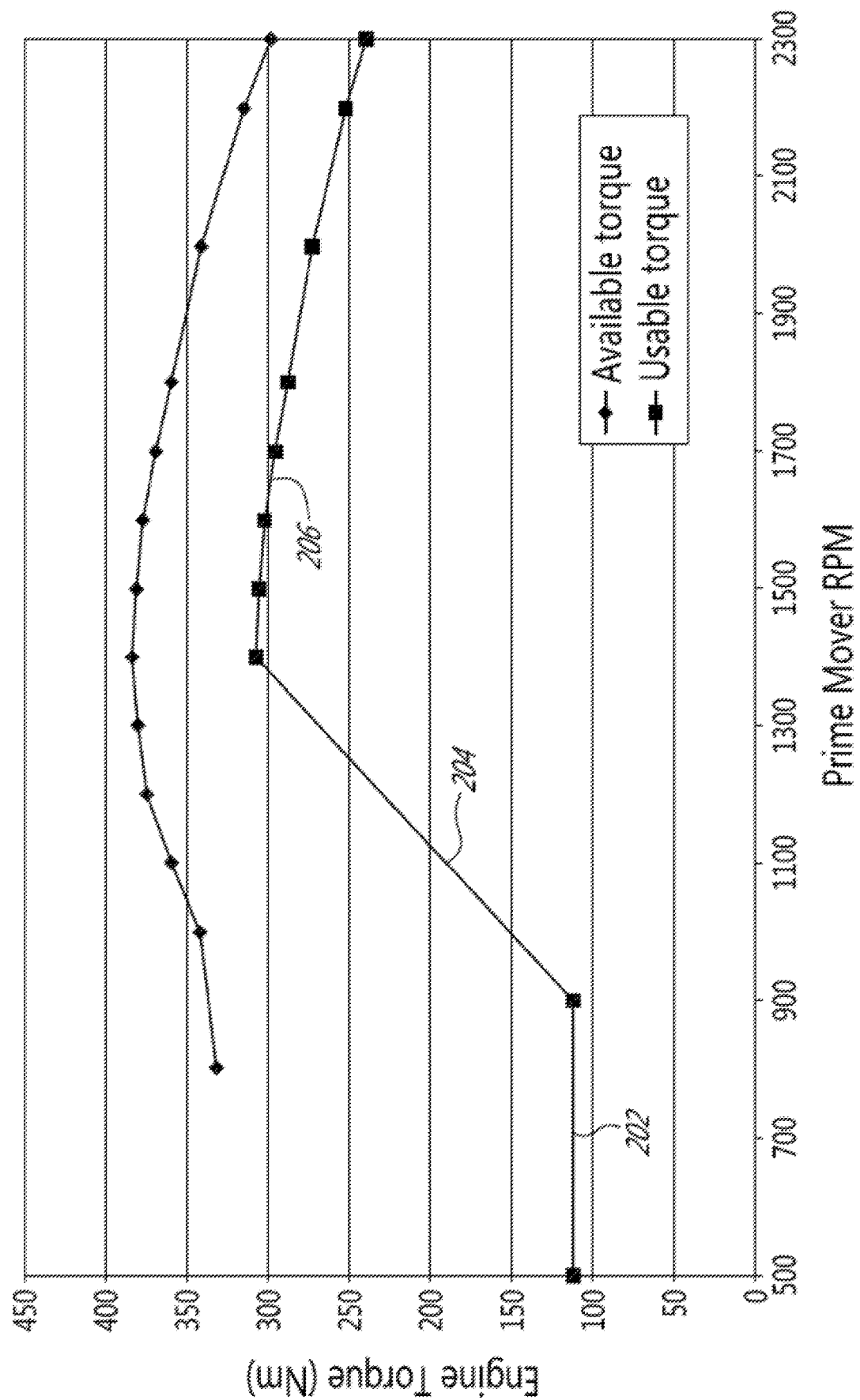
FIG. 3 is a graph illustrating the available torque vs. RPM of a prime mover and the usable torque vs. RPM.

FIG. 3 of the appended drawings illustrates the available torque vs. RPM for a particular ICE.

From the instantaneous available torque, the controller 42 determines a usable torque in step 104. The usable torque is often lower than the available torque and provides a safety margin to prevent the ICE 12 from stalling.

Again, FIG. 3 illustrates an illustrative and non-limiting example of the usable torque vs. RPM for a particular ICE. It is to be noted that the usable torque does not follow the available torque at low RPMs. The reason therefor will be explained hereinbelow.

It is to be noted that the usable torque illustrated in FIG. 3 is the usable torque at the output of the ICE 12. The use of a CVT 14 downstream of the ICE allows this usable torque to be modified by the CVT 14. Indeed, as in well known to those skilled in the art, the torque is multiplied as a function of the ratio of the CVT. The controller 42 therefore uses its knowledge of the instantaneous ratio of the CVT 14 to determine a usable torque at the input of the clutch 16 and this value of the usable torque at the input of the clutch is used in the next steps. In other words, the usable torque graph of FIG. 3 is multiplied as a function of the CVT ratio by the controller 42.

It is to be noted that the usable torque values can be stored in a look-up table provided in the main controller 42, for example. Accordingly, the controller 42 may quickly determine the usable torque from the speed of the output of the ICE 12.

The controller 42, in step 106, supplies the instantaneous usable torque to the clutch controller 44 that controls the clutch 16 so that slippage of the clutch 16 occurs if a torque greater than the usable torque attempts to pass therethrough. Accordingly, should a block load be applied, for example by preventing wheels of the off-highway vehicle from turning, the torque requested by the wheels and therefore attempting to pass through the clutch 16 increases drastically and quickly exceeds the usable torque. When this occurs, the clutch 16 slips, preventing the ICE from stalling and protecting the various components of the driveline, including the CVT 14. Indeed, as is well known to those skilled in the art, should the output shaft of the ICE be prevented from rotating while the ICE is operating, the ICE would stall. Slippage of the clutch 16 above a torque level therefore ensures that the output shaft of the ICE is not prevented from rotating.

The method 100 could stop there. It would therefore loop back to step 102 and repeat the above-described steps.

However, since the driveline 10 includes a CVT 14 that can inherently modify the speed ratio and therefore the available torque at the input of the clutch 16, supplemental steps may be added to the method 100 to improve the usability of the driveline 10.

Step 108 involves the determination of the slippage level of the clutch 16. This is done by the slip quantifier 46 and the slippage data is supplied to the main controller 42.

The controller 42, in step 110, branches to step 112 if the clutch slippage is non-null. In other words, if there is slippage, step 112 is performed.

In step 112, the controller 42 takes over the ratio control 38 and dictates the ratio of the CVT 14. The controller 42 is so configured that the ratio of the CVT is decreased as a function of the slippage of the clutch 16. Indeed, since the usable torque increases as the CVT ratio decreases, the slippage setpoint of the clutch 16 is automatically modified by the controller 42 and slippage may stabilize, decrease and/or stop.

One possible way of controlling the driveline 10 is to control the clutch slippage so as to stabilize it. This is done by gradually changing the CVT ratio until the clutch slippage remains substantially constant.

Step 112 loops back to step 102.

Should no slippage be detected in step 110, the step 114 is performed. In this step, if the controller 42 was controlling the CVT ratio, the control of the CVT ratio is gradually returned back to the user since the usable torque is sufficient to drive the load 20. This is done gradually so as to prevent sudden change in driving behavior, which is detrimental to the user driving sensations.

The performance of the driveline may be controlled by the user in those circumstances. This step returns to step 102 to loop the method 100.

Returning to FIG. 3, the non-limiting illustrative example of the usable torque graph may be separated in three zones. A low RPM zone 202, a medium RPM zone 204 and a high RPM zone 206.

In the low RPM zone 202, the usable torque is set significantly lower than the available torque. Accordingly, the slippage of the clutch 16 will be more pronounced at these speeds. In this zone, the usable torque is set low enough as to either prevent rotation of the output or allow "creeping" of the output given a small load depending on the desired driving sensation.

In the medium RPM zone 204, the usable torque linearly increases with the RPM but is still significantly lower than the available torque from the prime mover. The clutch slippage set point will therefore increase with increasing RPM. Accordingly, should a small block load prevent rotation of the wheels, an increase in RPM (while in the zone 204) may cause the wheels to rotate. This has been found to give better driving sensations to the operator. Of course, the linearity of the medium RPM zone is not required, and other functions could be used.

Finally, in the high RPM zone 206, the usable torque generally follows the available torque with a safety margin.

One skilled in the art will understand that the usable torque graph illustrated in FIG. 3 is a non-limiting example and that, depending on the application, it may not follow the available torque and/or provide a safety margin.

As an example of application of the driveline 10, the operation of a loader tractor will be briefly described. Such a tractor often has to push against obstacles, for example when its bucket is being filled. When this is the case, the ICE must be prevented from stalling. By providing a driveline as proposed herein, the ICE stalling would be prevented by the selective slipping of the clutch and the torque supplied to the wheels would be increased by the control of the CVT ratio. All that without special intervention of the operator other than actuating the throttle control according to the desired speed of the vehicle.

Of course, an optional clutch pedal or other user control could be used to disengage the clutch 16 manually by the operator.

As will be easily understood by one skilled in the art, the main controller 42 could integrate the ratio controller 38, the clutch controller 44 and/or the slip quantifier 46.

Returning briefly to FIG. 1 of the appended drawings, as will easily be understood by one skilled in the art, since the driveline 10 is equipped with speed sensors 28, 32 at both the input and output of the clutch 16 to determine its slipping state, it is possible to calculate the temperature increase of the clutch 16 when it is slipping and to have the controller 42 preemptively decrease torque allowed to pass through the clutch to limit its temperature increase or ultimately disengage the clutch 16 should the determined temperature reach a predetermined threshold.

Figure 4:
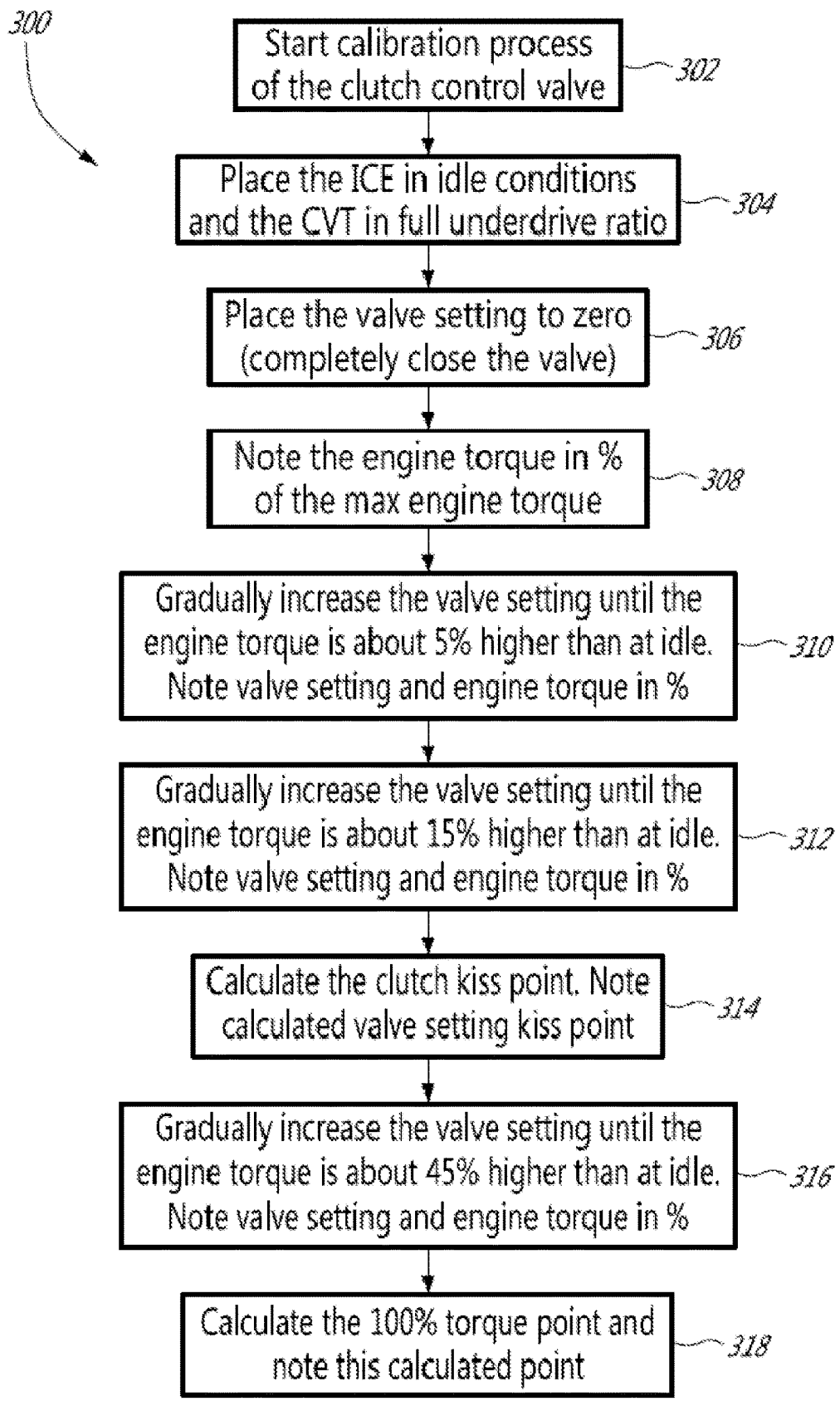
FIG. 4 is a block diagram of a method for calibrating a slip control arrangement according to an illustrative embodiment.
Figure 5:
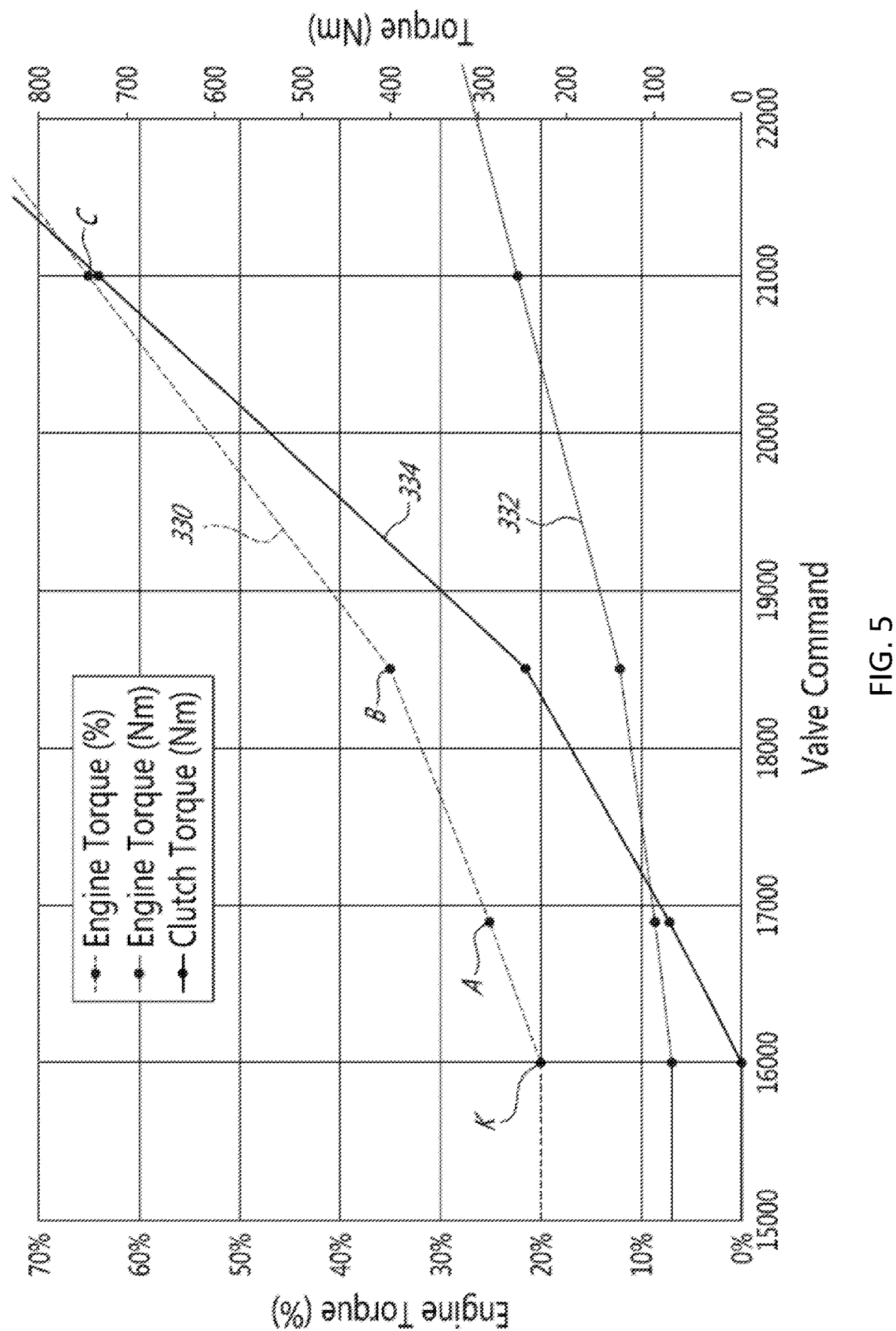
FIG. 5 is a graph illustrating the valve command with respect to the engine torque.

Turning now to FIGS. 4 and 5 of the appended drawings, a calibration method for the clutch controller 44 will be described.

Generally stated, the calibration method aims at finding the relationship between the command sent to the clutch controller 44 by the controller 42 and the torque allowed to pass through the clutch 16 before it slips.

As mentioned hereinabove with reference to FIG. 1, the controller 42 is connected to the ICE 12 so that, through the CAN bus, the controller 42 knows the instantaneous value of the torque percentage (%) developed by the ICE, which is interesting during the calibration phase as will be described hereinbelow. The controller 42 also knows the instantaneous ratio of the CVT via the speed sensors 24 and 28. Therefore, the controller 42 knows the torque multiplication factor given by the ratio of the CVT 14.

FIG. 4 is a bloc diagram of a calibration method 300 according to an illustrative embodiment. As mentioned hereinabove it is interesting to know precisely the relationship between the command given to the hydraulic valve of the clutch controller 44 and the maximal torque allowed to pass through the clutch 16 before it slips.

The first step 302 is the start of the calibration method. During this starting step and before the calibration is performed, the vehicle is operated for some time to bring the various hydraulic oils, and the ICE to an appropriate working temperature.

Also, during the calibration process, the parking brake of the vehicle, or other means, is engaged so as to prevent movements of the vehicle.

In the next step 304, the method 300 according to an illustrative embodiment, places the ICE in idle conditions. In other words, a relatively low rotational speed, for example 1100 RPM, of the ICE is selected and the CVT ratio is placed in its full underdrive.

One skilled in the art will understand that a different rotational speed of the ICE could be used as well as another CVT ratio.

As can be seen from the curve 330 of the graph of FIG. 5, which shows the valve command vs. the engine torque %, the ICE develops about 20% of its torque when it is in idle. This is explained by the fans, pumps, etc., that are operating even when the vehicle is not moving.

In step 306, the valve setting is set to zero meaning that the valve is completely closed. The torque percentage (20% in our illustrative example of FIG. 5) is recorded as an idle engine torque value by the controller in step 308.

In step 310, the valve command value is gradually increased until the torque % of the ICE increases above its baseline of about 20% and stabilizes to about 25% (see point A in FIG. 5). When this happens, the value of the ICE torque in % and the valve command value are recorded as a first point linking the valve command value and the torque % value.

In the example of FIG. 5, the ICE can develop a maximal torque of about 400 Nm (newton meters). Accordingly, a valve command value of about 16800 is such that the ICE develops a torque of about 100 Nm. These values are computed by the controller and shown as curve 332 in FIG. 5.

As has been discussed hereinabove, since the parking brake is engaged, the clutch constantly slips since its movable disk is prevented from rotating by the parking brake. The increase of pressure in the clutch, caused by the increase of the valve command value, causes the torque developed by the ICE to increase since the drive element of the clutch is increasingly more difficult to rotate.

In step 312, the valve command value is gradually increased until the torque % of the ICE stabilizes at about 15% above the idle, i.e. in this case at about 35% (see point B in FIG. 5). When this happens, the value of the ICE torque in % and the valve command value, the valve setting, are recorded as a second point linking the valve command value and the torque Nm value. As can be seen from the example of FIG. 5, a valve command value of about 18500 is such that the ICE develops a torque of about 140 Nm.

With the first and second point linking the valve command value and the torque Nm value, it is possible to calculate the approximate clutch kiss point, i.e. the valve setting when the clutch makes initial frictional contact and begins transmitting torque between its fixed and movable disks. Indeed, since the torque fluctuates before stabilizing at about 25% is step 310, we need to approximate its departure point from the idle condition.

Therefore, in step 314, the clutch kiss point is calculated by assuming linearity between point A and point B in FIG. 5 and by extending this straight line until it reaches the idle ICE % of 20%. We therefore find a valve setting value of about 16000 for the clutch kiss point (see point K in FIG. 5).

The process is continued, in step 316, by increasing the valve command value until the pressure present in the clutch causes the ICE to develop a predetermined torque of 65%, i.e. about 45% higher that at idle conditions, (see point C in the example of FIG. 5). Again, when the torque is stabilized, the numerical value of the valve setting is recorded along with the torque developed as a third point linking the valve command value and the torque Nm value. As can be seen from the example of FIG. 5, a valve command value of about 21000 is such that the ICE develops a torque of about 260 Nm.

Presuming a linearity of the valve command value to torque % between points B and C of FIG. 5, the controller may calculate, in step 318, the valve command value required to reach a 100% torque value. This valve command value is recorded.

From the data used to calculate the curve 332 of FIG. 5, which illustrates the torque at the output of the ICE with respect to valve command values, the controller 42, knowing the ratio of the CVT and of other gear trains (not shown) that may be part of the driveline, may calculate the torque at the output of the clutch with respect to valve command values. These calculations are illustrated as curve 334 in FIG. 5. It is the data corresponding to this curve 334 that is used during the operation of the driveline.

One skilled in the art will understand that the curves illustrated in FIG. 5 are for illustration and explanation purposes only.

It is to be noted that the 65% value of the torque % has been determined so that there is less risk of damaging the clutch during the calibration process. Indeed, since the portion between 35% and 100% of the torque % is generally linear, there is no need to go above 65% to adequately extrapolate the valve command value to reach 100% of the torque % of the ICE.

Of course, more points linking the valve command value to the torque % may be obtained to refine the extrapolations.

Turning briefly to FIG. 5 of the appended drawings, the first curve 330 links the various points K, A, B and C.

The second curve 332 transposes the torque % values in torque values in Nm for the particular ICE used. Indeed, knowing the maximal torque (in Nm) that may be developed by the ICE, the controller may determine the torque value of the various torque % values.

Knowing the full underdrive ratio of the CVT (for example 2.45 to 1), the ratios of optional gear trains (not shown) that may be present between the ICE and the clutch, and the various efficiency of the different driveline elements, the controller 42 may calculate the torque (in Nm) at the output of the clutch. The third curve 334 transposes the torque at the ICE 12 into the torque at the clutch 16 when the CVT is in full underdrive.

The third curve 334 is therefore the curve that is used in step 106 of FIG. 2 when the valve is controlled to allow only the passage of the usable torque.

It is to be noted that this calibration procedure is advantageously done on every driveline since all the valves and clutches are not identical and may behave differently.

It is also to be noted that the temperature of the hydraulic oil is recorded during the calibration process. Indeed, it has been found that the pressure applied between the plates of the clutch for a given valve command value may vary with the temperature of the hydraulic oil used to apply the pressure. Accordingly, it may be interesting to compensate for the difference of the oil temperature during the calibration process and the oil temperature during use. As a non-limiting example, the calibration procedure could be performed with the oil being at different temperatures to therefore calibrate the system in function of the oil temperature.

It is to be noted that the above calibration technique can be successively performed a number of times to improve the accuracy thereof. As a non-limiting example, the above calibration is successively done in 5 iterations. The highest and lowest iterations are discarded, and the remaining 3 iterations are averaged to yield a final calibration.

It is also to be noted that the order of the steps in the calibration method 300 discussed hereinabove could be changed. As a non-limiting example, the calculation of the kiss point of step 314 could be performed after the calculation of the 100% torque point in step 318.

In the post-calibration operation of the driveline 10, when the controller 42 determines that a predetermined torque should be allowed through the clutch 16, it may control the valve of the clutch controller 44 so that it reaches the valve setting required to allow such torque to pass through and to slip should a higher torque be trying to pass through, according to the curve 334.

In other words, when the calibration is complete, the vehicle is ready to be used without fear of stalling the ICE. Indeed, as mentioned hereinabove, since the controller 42 may determine the usable portion of the available torque of the ICE, the controller 42 may thus control the clutch control valve to the appropriate valve command value, as determined during the calibration process, so that the clutch starts slipping should the torque attempting to pass through is greater that the available torque.

As will be apparent to one skilled in the art, when a clutch is not submitted to hydraulic pressure by the control valve, the hydraulic fluid present therein is normally evacuated. To provide an interesting driving experience to the user, and to ensure a prompt start-up, it is interesting to pre-fill the clutch before giving it a precise valve command value. To pre-fill the clutch a short duration filling pulse at the maximal valve command value is done. The required valve command value may follow this short duration filling pulse.

To determine the optimal duration of the short duration filling pulse, another calibration technique is proposed.

This fill time calibration involves subjecting the clutch to a sequence of short pulses of valve opening at a predetermined valve command value, often the maximal valve command value, i.e. that the valve is completely open. Each short pulse of the sequence is slightly longer that the previous short pulse. In other words, the successive short pulses increase in duration. Meanwhile, the engine torque % is monitored. When a change is seen in the engine torque % value, the length of the last pulse duration supplied to the clutch is considered the adequate clutch filling time.

Again, this calibration may be performed multiple times and the results are averaged.

Again, this calibration procedure is advantageously done on every driveline since all the valves and clutches are not identical and may behave differently.

In use, when the vehicle is started from standstill, the short duration pulse of the valve command value is done before the valve command value is set to the required value.

One skilled in the art will also understand that the time required for the clutch to become empty is slower than the filling time. It has been found that the emptying time is about four times as long as the filling time. Accordingly, by calibrating the filling time, an approximate emptying time is also determined. When the controller determines that the clutch must be refilled while the emptying time is not yet finished, the controller adjusts the following filling time accordingly.

It is to be understood that the calibration method for a slip control arrangement of a driveline including a continuously variable transmission is not limited in its application to the details of construction and parts illustrated in the accompanying drawings and described hereinabove. The calibration method for a slip control arrangement of a driveline including a continuously variable transmission is capable of other embodiments and of being practiced in various ways. It is also to be understood that the phraseology or terminology used herein is for the purpose of description and not limitation. Hence, although the calibration method for a slip control arrangement of a driveline including a continuously variable transmission has been described hereinabove by way of illustrative embodiments thereof, it can be modified, without departing from the spirit, scope and nature thereof.

What is claimed is:

1. A calibration method for a slip control arrangement of a vehicle driveline including a continuously variable transmission where slipping is allowed via a clutch provided with a clutch controller that determines, via a valve mechanism, the amount of torque allowed to pass through the clutch before the clutch starts slipping; the driveline including a prime mover and a controller so connected to the prime mover as to receive torque data therefrom; the calibration method of the valve mechanism comprising:
   placing the prime mover in predetermined rotational speed conditions while preventing the vehicle from moving;
   closing the valve mechanism;
   recording an idle engine torque value from the torque data from the prime mover;
   gradually opening the valve mechanism until a first predetermined engine torque data value is reached and recording a first valve setting value and a corresponding engine torque value;
   gradually opening the valve mechanism until a second predetermined engine torque data value is reached and recording a second valve setting value and a corresponding engine torque value;
   calculating a clutch kiss point valve setting;
   gradually opening the valve mechanism until a third predetermined engine torque data value is reached and recording a third valve setting value and a corresponding engine torque value;
   calculating a 100% torque point; and
   calculating clutch torques corresponding to engine torque values.

2. The calibration method as recited in claim 1, wherein the calculation of the clutch kiss point is done by the controller using the idle engine torque data and the first and second recorded valve values and their corresponding engine torque values.

3. The calibration method as recited in claim 1, wherein the calculation of the 100% torque point is done by the controller using the second and third recorded valve values and their corresponding engine torque values.

4. The calibration method as recited in claim 1, wherein placing the prime mover in predetermined rotational speed conditions include placing the continuously variable transmission in full underdrive ratio.

5. The calibration method as recited in claim 1, wherein the engine torque values are expressed in percentage of the maximal engine torque.

6. The calibration method as recited in claim 1, wherein the first predetermined engine torque data value is about 5% higher than the idle engine torque value.

7. The calibration method as recited in claim 1, wherein the second predetermined engine torque data value is about 15% higher than the idle engine torque value.

8. The calibration method as recited in claim 1, wherein the third predetermined engine torque data value is about 45% higher than the idle engine torque value.

9. In a driveline comprising a prime mover, a continuously variable transmission, a controller so connected to the prime mover as to receive torque data therefrom, a slip control arrangement including a clutch so controlled by a clutch controller including a valve mechanism to allow a controllable amount of torque to pass through the clutch and to slip if a higher amount of torque tries to pass, a calibration method of the valve mechanism comprising:
   placing the prime mover in predetermined rotational speed conditions while preventing the vehicle from moving;
   closing the valve mechanism;
   recording an idle engine torque value from the torque data from the prime mover;
   gradually opening the valve mechanism until a first predetermined engine torque data value is reached and recording a first valve setting and a corresponding engine torque value;
   gradually opening the valve mechanism until a second predetermined engine torque data value is reached and recording a second valve setting and a corresponding engine torque value;
   calculating a clutch kiss point;
   gradually opening the valve mechanism until a third predetermined engine torque data value is reached and recording a third valve setting and a corresponding engine torque value;
   calculating a 100% torque point; and
   calculating clutch torques corresponding to engine torques.

10. The driveline as recited in claim 9, wherein the calculation of the clutch kiss point is done by the controller using the idle engine torque data and the first and second recorded valve values and their corresponding engine torque values.

11. The driveline as recited in claim 9, wherein the calculation of the 100% torque point is done by the controller using the second and third recorded valve values and their corresponding engine torque values.

12. The driveline as recited in claim 9, wherein placing the prime mover in predetermined rotational speed conditions include placing the continuously variable transmission in full underdrive ratio.

13. The driveline as recited in claim 9, wherein the engine torque values are expressed in percentage of the maximal engine torque.

14. The driveline as recited in claim 9, wherein the first predetermined engine torque data value is about 5% higher than the idle engine torque value.

15. The driveline as recited in claim 9, wherein the second predetermined engine torque data value is about 15% higher than the idle engine torque value.

16. The driveline as recited in claim 9, wherein the third predetermined engine torque data value is about 45% higher than the idle engine torque value.

* * * * *